(No Model.) 3 Sheets—Sheet 1.
J. J. FAULKNER.
MOTOR FOR OPERATING FANS, &c.
No. 549,117. Patented Nov. 5, 1895.
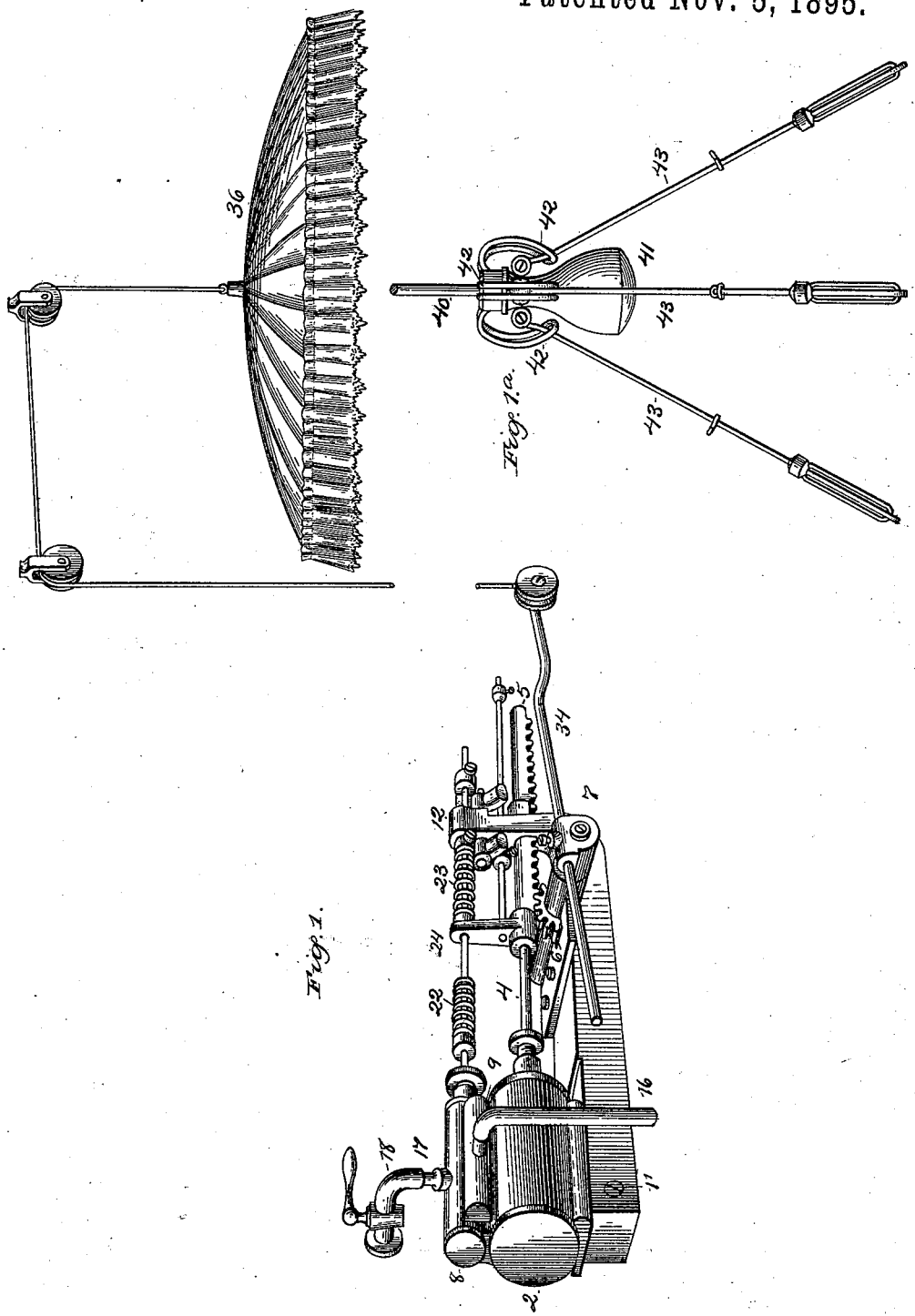
Witnesses.
Victor J. Evans.
Marre Wilson
Inventor.
James J. Faulkner.
By E. M. Marble & Sons
Attorneys

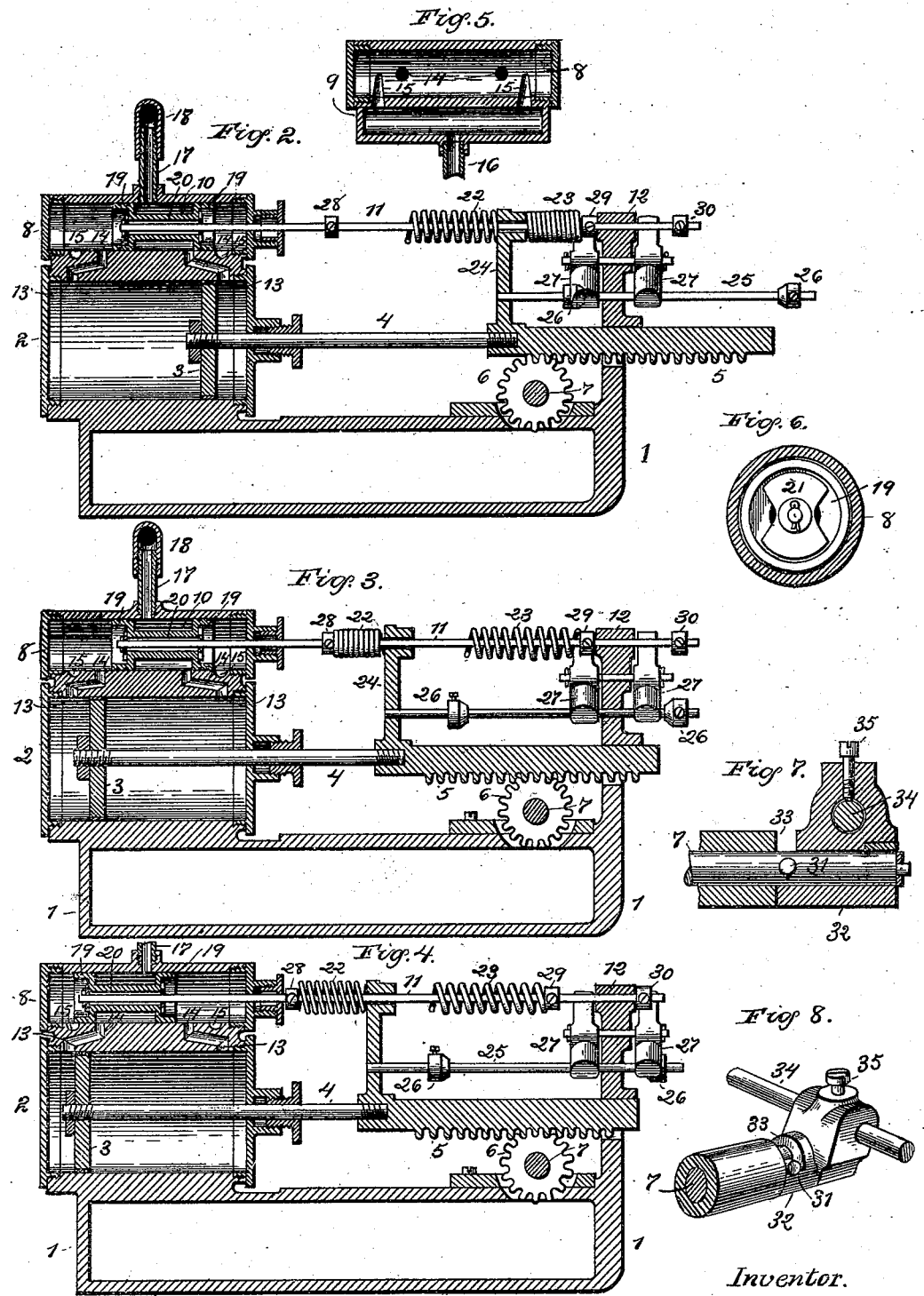

(No Model.) 3 Sheets—Sheet 3.
J. J. FAULKNER.
MOTOR FOR OPERATING FANS, &c.
No. 549,117. Patented Nov. 5, 1895.
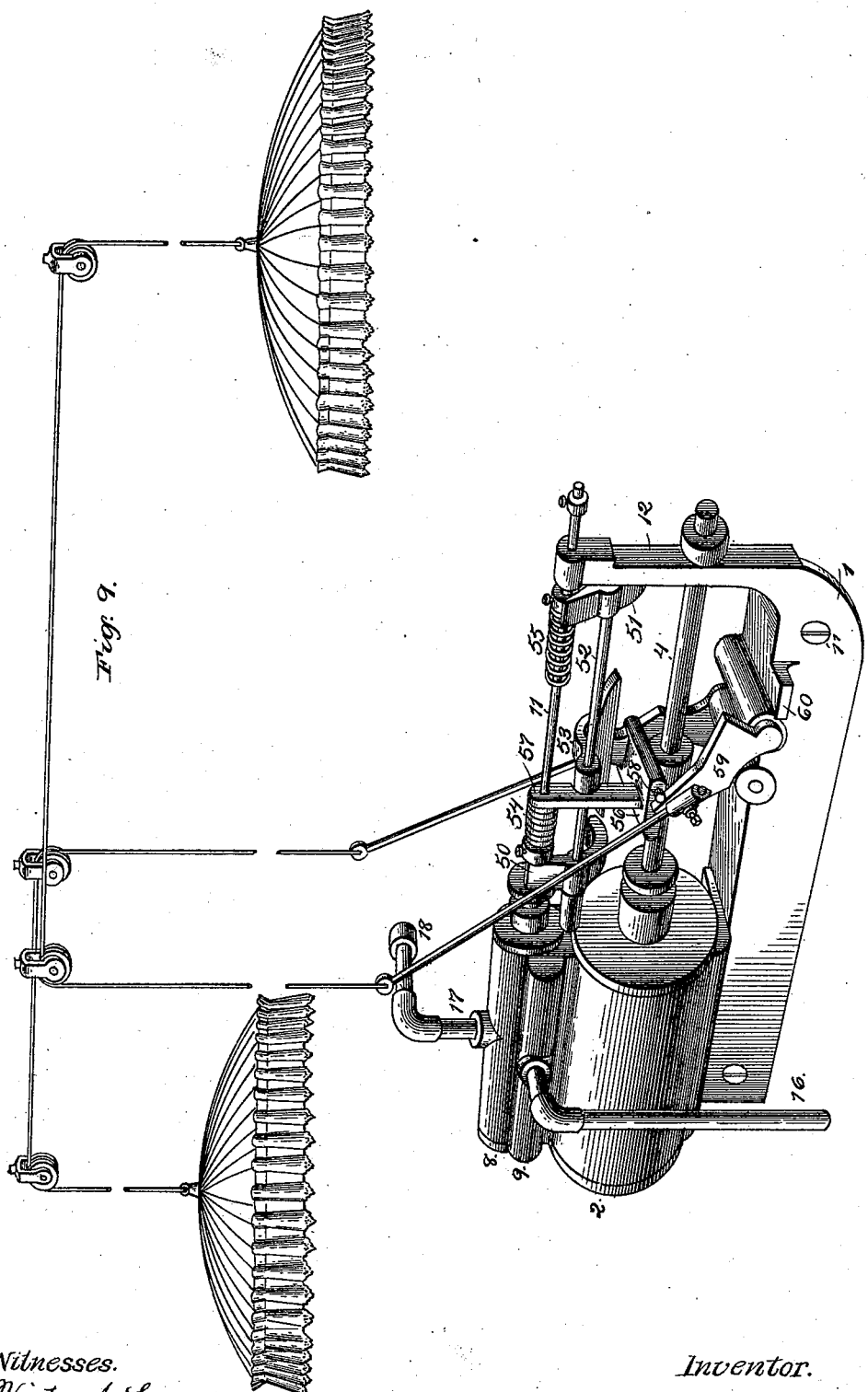
Witnesses.
Victor J. Evans.
Marie Wilson
Inventor.
James J. Faulkner.
By E. M. Marble
Attorneys.

UNITED STATES PATENT OFFICE.

JAMES J. FAULKNER, OF MEMPHIS, TENNESSEE, ASSIGNOR OF ONE-HALF TO E. J. FITZHARRIS, OF SAGINAW, MICHIGAN.

MOTOR FOR OPERATING FANS, &c.

SPECIFICATION forming part of Letters Patent No. 549,117, dated November 5, 1895.

Application filed December 12, 1894. Serial No. 531,566. (No model.)

*To all whom it may concern:*

Be it known that I, JAMES J. FAULKNER, a citizen of the United States, residing at Memphis, in the county of Shelby and State of Tennessee, have invented certain new and useful Improvements in Motors for Operating Fans, &c.; and I do hereby declare the following to be a full, clear, and exact description of the invention, such as will enable others skilled in the art to which it appertains to make and use the same.

My invention relates to improvements in motors designed for operating automatic fans, hammocks, cradles, and the like; and it consists in an improved hydraulic motor for producing a reciprocating motion especially suited in its construction for operation in connection with automatic fans, &c., the construction and arrangement of the parts of which will be hereinafter fully described, and particularly pointed out in the claims.

My invention is especially directed toward providing a motor which can be used successfully at all times and under all conditions for operating the various household devices which the energy and luxury of the past few years have brought forth.

Within the past few years a great industry has sprung up in the manufacture of automatic fans suitable for use in parlors, dining-rooms, bed-rooms, &c. Various styles and types of motors have been used for this purpose. Several types of spring-motors are now upon the market and are used with considerable success; but they have the disadvantage of requiring to be rewound every day or two, or perhaps oftener, and of not running with the same velocity when the operating-spring is nearly unwound that they did at the beginning of the run. The care and attention which have to be displayed in the use of this style of motors seriously detracts from their usefulness. Electric motors are also much used, but their cost is so great as to negative their use in many places where they are most needed, and by cost I refer not only to the expense of installing such a motor, but to running the same. In fact, the ideal motor, that which while at the same time cheap to manufacture and sell, is perfectly suited for the work demanded, will not get out of order, and is adapted for use in any position or place, is not yet in existence.

The object of my invention is to provide an automatically-operated motor which will be suited for use in actuating mechanical devices such as fans, rocking cradles, swinging hammocks, and the like, and which will meet the full demands above referred to.

The motor which I have constructed to fulfill the object of my invention is a hydraulic motor entirely automatic in its operation and designed to transmit to the fan or other devices operated a reciprocating movement, which may be either vertical or horizontal, the manner in which the force is used being dependent upon the transmitting means employed.

My improvements in motors designed to produce reciprocating motion have been directed, first, to the valve mechanism for controlling the ingress and egress of the water to the main cylinder; second, to the production of a perfect-balanced valve adapted to avoid shock and noise in its movement; third, to trip mechanism for operating said valve, and, fourth, to means for transmitting the reciprocating movement thus obtained to the fan or other object operated.

My invention is fully represented in the drawings which accompany and form a part of this application, in which the same reference-numerals refer to the same or corresponding parts, and in which—

Figure 1 is a perspective view of my improved motor, showing the same in operative connection with the fan which it is designed to operate. Fig. 1ª is a detail view of the form of hanger which I use to support the fans when I desire to operate more than one of the same by a single connecting-cord. Fig. 2 is a central section of my motor, showing the cylinder, the piston, the means by which the piston transmits its motion, the balanced valve for controlling the operation of the motor, and the trip mechanism by which such valve is operated by the movement of the main piston. In this figure the valve is shown at the extreme right end of its movement. Fig. 3 is a similar view, the position of the piston in the main cylinder being different from its position in Fig. 1 from the fact that water has been admitted to the same and has forced the piston nearly to the extreme end of its stroke. The end of its stroke has not been reached as yet, however, and the balanced valve has not been shot by the mechanism operated by the piston. Fig. 4 is a similar view, the piston having reached the extreme limit of its movement and now occupying the end of cylinder opposite to that at which it is shown in Fig. 2, the valve having been shot and the piston being about to be moved backward. Fig. 5 is a detail view of the valve-chamber, showing the ports for the ingress and egress of water. Fig. 6 is an enlarged front view of the balanced valve, showing the angled plate, which enables the valve to move without shock or noise. Fig. 7 is a sectional view of the end of the rod by which the movement of the piston is to be transmitted to the object to be operated upon, showing the slotted casting mounted on said rod, by means of which the full movement of the operative cord is obtained. Fig. 8 is a perspective view of the same. Fig. 9 is a perspective view of my motor, showing a different form of mechanism for operating the balanced valve and showing the motor in operative connection to two fans.

Referring to the drawings, 1 represents the base of my motor. Screw-holes 1' are formed in this base, by means of which the motor can be screwed to a wall or in any other convenient position, so as to be readily connected to the source of water-supply. Upon this base-frame is mounted the cylinder 2, within which moves the piston 3, to which is attached the piston-rod 4. The outer end of the piston-rod is formed with the rack 5 on its lower surface, which meshes with the pinion 6, keyed to the transmitting-shaft 7, and thus transmits its motion to said shaft.

On the top of the cylinder 2 is mounted a valve-chamber 8, provided with an exhaust-chamber 9. In the valve-chamber reciprocates the balanced valve 10. (Shown in front view in Fig. 6.) To this valve is attached the valve-rod 11, which has an outer bearing in the projecting standard 12, which standard is integral with the base 1, and upon which is located the various springs and collars by which, in a manner hereinafter to be described, the valve is caused to be shot at the proper moment, and thus fulfill its function.

At both ends of the cylinder 2 are formed ports 13, which are in communication through suitable passage-ways with ports 14, formed in the valve-chamber. It is through these ports 13 and 14 that water is alternately admitted to and exhausted from the cylinder. Egress-ports 15, formed in the valve-chamber, permit the escape of the water to the exhaust-chamber 9, and thence out by delivery-pipe 16. The water-ingress pipe is represented at 17 and may be directly connected, as shown in Fig. 1, to the faucet 18 of the water-supply, thus arranging for the complete automatic operation of the motor.

I will now proceed to describe in full the construction and operation of the balanced valve. This valve is best shown in Figs. 2, 3, and 4, and consists of a hollow casing having two heads 19, which fit snugly to the sides of the valve-chamber, and a centrally-reduced portion 20, which permits the inflowing water to reach the inlet-ports, so that it can operate the piston. Through the hollow interior of the valve passes the valve-rod 11, and in each end of the hollowed ends of the valve there is held by the rod 11 over the central orifice into the valve an angled plate 21, which obstructs, but does not entirely close, the said hollowed interior of the valve. Through the small openings thus formed in the ends of the valve the water passes at the end of the valve-strokes, and thus cushions the valve, preventing the shock and noise which would otherwise be attendant to its movement.

In Fig. 2 the piston is shown at the extreme right end of its movement, water flowing in through the inlet-pipe 17 and through valves 14 and 13 to the right of the piston, so as to force it through the cylinder, which we may suppose to be filled with water. The water already in the cylinder will be forced out as the piston advances through the ports 13 and 14 at the left end of the valve-chamber, through the egress-port 15, and thence through the exhaust-chamber 9 to the outlet-pipe and away from the motor. The water power will be sufficient to move the piston to the extreme end of its stroke; but it is necessary to provide for the shooting of the valve when it has reached its extreme stroke, so that its backward movement may be possible. the valve must be brought into operation It is obvious, also, that the means used to shoot when the extreme limit of the piston-stroke has about been reached and not before.

On valve-rod 11 are loosely mounted spiral springs 22 and 23, the said springs being on opposite sides of the casting 24, which projects upward from the piston-rod 4 and encircles with its upper end the said valve-rod, serving in its operation to compress springs 22 and 23 alternately, and having attached thereto and projecting rearward therefrom the rod 25, which bears the coned collars 26, which act, in a manner hereinafter to be described, to trip the weighted dogs 27, journaled upon a pin projecting from the standard 12 and normally resting with their upper ends against the valve-rod. Upon the valve-rod 11 are also keyed the collars 28, 29, and 30, which when properly set give the proper movement to the balanced valve.

Comparing now closely Figs. 2, 3, and 4, in Fig. 2 we see that the piston is at the extreme right end of its movement and that the spring 23 has forced the valve-rod 11 to the extreme right end of its movement, the left dog 27 being forced upward and away from the valve-rod by the left coned collar 26, with the upper end of the right dog 27 resting against the valve-rod. As the water admitted to the cylinder forces the piston to the left, the upright casting 24 and the parts connected therewith are likewise forced to the left, since they are rigidly connected with the piston. In Fig. 3 we see, therefore, that the head of the upright casting 24 is exerting a pressure against the spring 22, said spring being confined and held from movement by the nut 28. The valve-rod 11 is prevented from movement by the dog 27, engaging with the nut 30, and thus the valve is still held in the same position that it was in Fig. 2. As the piston moves still farther forward, the right-hand coned collar 26 will lift the right-hand dog 27 until, as shown in Fig. 4, when the extreme end of the stroke is reached said dog is lifted and removed from engagement with the collar 30, and the spring 22, pressing against nut 28, is now allowed to be relieved and to shoot the valve, which it has done in Fig. 4, the parts being now in just the reverse position from that shown in Fig. 2. The movement of the balanced valve is quite sharp; but shock and noise are prevented by the water being allowed to pass through the openings formed by the angled plate 21 into the interior of the valve, and thus communicating the pressure to the other end of the valve-chamber. Having thus followed the movement of the piston from one end of the cylinder to the other, it is easy to be understood how the same movement takes place in its backward movement, except that the movements detailed are reversed, and how the spring 23 is compressed against the nut 29 until the left coned collar 26 raises the left dog 27 and allows the valve to be shot backward, when the parts are in the position shown in Fig. 2. It will thus be seen that the means which I have devised for operating the balanced valve are entirely automatic in their operation, are simple in construction, durable, and are not easily gotten out of order. The motor can operate for an indefinite length of time with no attention and can be started or stopped by turning on or off the water. No care or attention whatever is needed to operate the motor, and its construction is such as to permit it by suitable nickeling to be attractive and ornamental in apearance.

The means shown in Figs. 1 and 8 for transmitting the rotary movement of the shaft 7, on which pinion 6 is mounted, to the fan or other object to be operated are very simple. On the end of shaft 7 is a pin 31, which has a movement in the semicircular slot 33, cut in casting 32, which casting is loosely mounted on shaft 7 and is provided with an apertured head, through which the operative arm 34 may be passed and set by set-screw 35. The end of the arm 34 is connected by a suitable pulley connection to the fan 36, which is weighted in some suitable manner and is caused by the operation of the motor to reciprocate up and down, and thus give a very gentle and delightful breeze, the weight serving to make the movement of the fan positive and the fringed border serving to guide and direct its movement.

In the operation of the motor and fan we may suppose the parts to be in the position shown in Fig. 2, with the pin 31 having just completed its movement of the casting 32, and thus one-half of the reciprocation of the fan. The weight of the fan itself causes the casting 32 to now turn until the pin 31 rests against the opposite end of the slot 33, cut in casting 32. The movement of the piston now commences and imparts a movement to the pin 31, which acts to impart a rotary motion to the casting 32, and thereby to raise the fan. When the movement of the piston stops and the piston is at the position shown in Fig. 4, the fan will be raised just the extent to which it fell at the beginning of the movement detailed, and will now, as the balanced valve is shot and the piston caused thereby to move backward, fall again through the limit of the movement allowed by the slot 33, cut in the casting 32, it again being raised as the pin 31 engages with the end of the slot 33 and rotates the casting. The complete movement of the operative rod is thus a full circle; but the fan is reciprocated by each rotation of the casting 32, and thus is reciprocated twice by a single reciprocation of the piston. The amount of vertical movement given to the fan is determined by the length of the crank-arm of the operative arm 34, and this can be varied by changing the setting of the said arm.

In Fig. 1$^a$ I have shown a form of hanger which I use when I wish to operate more than one fan by a single connecting-cord. The rod 40 is to be attached to the operative cord. At the end of this rod is a weighted knob 41, which gives the weight necessary to provide for the movement of the fans. To the upper end of said weighted knob are secured downwardly-curved wire guides 42, which permit the movement of the supporting-arms 43 from the position when such arms are folded close to the rods 40 to the position in which they are shown in the drawings, when said rods rest against the end of the slot formed in the guides. Fans can be attached to the different operative arms 43, and thus three or more fans can be operated by a single operative cord. It is obvious that more than three fans can be operated, varying the number of the rods 43 used.

In Fig. 9 I have shown a modified form of the mechanism used to operate the balanced valve and to transmit the movement of the piston to the fan or other object to be operated. The cylinder, valve-chamber, and valve are the same in this construction as in that shown in the preceding figure, and therefore are not here illustrated. In this construction the weighted trips are placed at different ends of the valve-rod, trip 50 being close to the valve-chamber head and trip 51 being next to the standard 12, and the trips are journaled on the rod 52, upon which moves the casting 53, which is designed to operate said trips and allow the pressure of the springs 54 and 55 to shoot the valve in alternately opposite directions. The casting 53 forms a part of the main casting 56, which is provided with a suitable bearing upon the piston-rod 4 and is rigidly connected to said piston-rod, so as to move with the same. Upon the main casting 56 is formed the upright standard 57, which upper end encircles the valve-rod 11 and acts to compress the springs 54 and 55, loosely mounted on the same, and, further, the pins 58, only one of which is shown, which, by pressing against the revolubly-mounted standards 59, to which standards the operative rods, connected by cord connections to the fans or other objects operated, are adjustably secured, move said standards and raise the fans. Bearing in mind the operation of the motor already described, it will be seen that in this construction as the main casting 56 is caused to move backward and forward by the piston-rod 4 the ends of the casting 53 will trip the weighted trips 50 and 51, thus allowing the springs 54 and 55, which have been alternately compressed by the upright standard 57, to shoot the balanced valve, and thus to arrange for the operation of the motor. The pins 58, projecting from the main casting 56, serve to operate the standards 59, and thus to raise the fans which are connected to said standards, and the weight of the fans is sufficient to cause the standards to be forced back into contact with the stops 60 as the movement of the piston-rod 4 allows the casting 56 to reciprocate.

It is evident that modifications may be made of the structures described without departing from the spirit and scope of my invention. Different forms of trips may be used, and the mechanism for operating the same may be altered, and still the method of operation which I have devised will not be materially changed; so What I desire to claim as new and secure by Letters Patent is—

1. In a motor for operating fans, &c., the combination with a cylinder, a piston, and means for imparting the motion of the same to the object to be acted upon, of a valve chamber having suitable ingress and egress ports, a balanced valve operating in the same, a valve rod connected therewith, springs loosely mounted on said valve rod, collars for confining the actions of said springs, trips mounted on said valve rod for locking the rod until the time for a movement of the valve, and a rod connected with the piston and encircling said valve rod, and having attached thereto a rod having coned collars mounted upon the same for operating the trips, for compressing the springs and operating the valve, substantially as described.

2. In a motor for operating fans, &c., the combination with a cylinder, a piston 2, a valve rod 4, and means for imparting the motion of the same to the object to be acted upon, of a valve chamber 8 having suitable ingress and egress ports, a balanced valve operating in the same, a valve rod 11 connected therewith, a casting 24 attached to the piston rod 4 and encircling with its upper end the valve rod 11, springs 22 and 23 loosely mounted upon said valve rod on opposite sides of said casting, collars 28, 29 and 30, a rod 25 extending from said casting 24 and bearing the coned collars 26, and pivoted trips 27 adapted to be actuated by said coned collars 26, and to permit the proper operation of the balanced valve, substantially as described.

3. The combination with a valve casing, and a balanced valve operating therein, said valve having a hollow interior and open ends, of imperfect closures for the ends of said valve, whereby the action of the valve will be controlled by the limited amount of water permitted to pass through said imperfect closures, substantially as described.

4. A balanced valve having a centrally reduced portion, having a hollow interior, and disks held in front of the ends of the valve and permitting only a small aperture to the interior of the valve, substantially as described.

5. A balanced valve having a centrally reduced portion, having a hollow interior, recesses formed in the ends of the valve, and disks held in said recesses over the openings into the interior of the valve, whereby only a small aperture is permitted, substantially as described.

6. In a motor for operating fans, &c., the combination with a cylinder and a suitably operated valve therefor, of a piston, a piston rod having a rack formed on the lower side of a portion of its length, a transversely journaled shaft bearing a pinion which meshes with said rack, a slotted casting rotatively mounted on said shaft, and a pin integral with said shaft, and engaging with the slot in the casting, whereby said casting will be moved by each partial rotation of the shaft, substantially as described.

7. In a motor for operating fans, &c., the combination with a cylinder and a suitably operated valve therefor, of a piston, a piston rod having a rack formed on the lower side of a portion of its length, a transversely journaled shaft bearing a pinion which meshes with said rack, a slotted casting having an apertured end mounted upon said shaft, a pin integral with said shaft and engaging with the slot in the casting, of a rod secured to the apertured end of the casting and connected to the object to be operated upon, substantially as described.

In testimony whereof I affix my signature in presence of two witnesses.

JAMES J. FAULKNER.

Witnesses:
W. A. BARRET,
C. L. BERLIN.